US007127305B1

(12) United States Patent
Palmon

(10) Patent No.: US 7,127,305 B1
(45) Date of Patent: Oct. 24, 2006

(54) METHOD AND APPARATUS FOR UNIFIED CONTROL OF MULTIPLE DEVICES

(75) Inventor: Eran Palmon, Palo Alto, CA (US)

(73) Assignee: Eyecon Technologies, Inc., Palo Alto, CA (US)

( * ) Notice: Subject to any disclaimer, the term of this patent is extended or adjusted under 35 U.S.C. 154(b) by 230 days.

(21) Appl. No.: 10/876,510

(22) Filed: Jun. 24, 2004

Related U.S. Application Data

(60) Provisional application No. 60/488,828, filed on Jul. 21, 2003.

(51) Int. Cl.
*G05B 15/00* (2006.01)
*G06F 15/16* (2006.01)

(52) U.S. Cl. ............................ 700/83; 700/17; 700/86; 700/87; 709/218; 709/249

(58) Field of Classification Search ................. 700/83, 700/17–19, 86, 87; 709/218, 220, 225, 229, 709/249
See application file for complete search history.

(56) References Cited

U.S. PATENT DOCUMENTS

| | | | | |
|---|---|---|---|---|
| 6,008,735 | A | 12/1999 | Chiloyan et al. | 340/825.22 |
| 6,401,059 | B1 * | 6/2002 | Shen et al. | 703/27 |
| 6,456,892 | B1 | 9/2002 | Dara-Abrams et al. | 700/83 |
| 6,498,567 | B1 | 12/2002 | Grefenstette et al. | 340/825.62 |
| 6,507,762 | B1 | 1/2003 | Amro et al. | 700/83 |
| 6,597,374 | B1 | 7/2003 | Baker et al. | 345/717 |
| 6,725,281 | B1 * | 4/2004 | Zintel et al. | 719/318 |
| 6,892,230 | B1 * | 5/2005 | Gu et al. | 709/220 |
| 6,910,068 | B1 * | 6/2005 | Zintel et al. | 709/220 |
| 6,914,551 | B1 | 7/2005 | Vidal | 341/176 |
| 2001/0033244 | A1 | 10/2001 | Harris et al. | 341/176 |
| 2002/0035621 | A1 * | 3/2002 | Zintel et al. | 709/220 |
| 2002/0071577 | A1 | 6/2002 | Lemay et al. | 381/110 |
| 2003/0046437 | A1 | 3/2003 | Eytchison et al. | 709/250 |
| 2004/0003051 | A1 | 1/2004 | Krzyzanowski et al. | 709/217 |
| 2004/0003073 | A1 | 1/2004 | Krzyzanowski et al. | 709/223 |
| 2004/0098456 | A1 | 5/2004 | Krzyzanowski et al. | 709/204 |
| 2004/0133704 | A1 | 7/2004 | Krzyzanowski et al. | 709/250 |
| 2004/0163073 | A1 | 8/2004 | Krzyzanowski et al. | 717/107 |
| 2005/0055472 | A1 | 3/2005 | Krzyzanowski et al. | 710/5 |
| 2005/0068222 | A1 | 3/2005 | Krzyzanowski et al. | 341/176 |
| 2005/0097478 | A1 | 5/2005 | Killian et al. | 715/851 |
| 2005/0128048 | A1 | 6/2005 | Krzyzanowski et al. | 340/3.71 |
| 2005/0141566 | A1 | 6/2005 | Krzyzanowski | 370/503 |
| 2005/0267935 | A1 * | 12/2005 | Gandhi et al. | 709/203 |

OTHER PUBLICATIONS

"Bluetooth Video Remote Control." Downloaded Dec. 17, 2004. Cambridge Consultants Inc., Boston, MA. Available online at http://www.cambridgeconsultants.com/wt_q_BluetoothVid.shtml.

(Continued)

*Primary Examiner*—Thomas Pham
(74) *Attorney, Agent, or Firm*—Dov Rosenfeld; Inventek

(57) ABSTRACT

A method and apparatus to control any one of a plurality of devices. The method comprises, for each device of the plurality, receiving a definition language. The definition language including a command description to be associated with the device. The method further comprises accepting input from a user. The method further comprises generating one or more control signals for at least one of the devices of the plurality. The generating is to control the at least one of the devices according to the accepted input. The generating uses the definition language and the accepted input.

1 Claim, 13 Drawing Sheets

OTHER PUBLICATIONS

T. Fuhrmann, M. Klein and M. Odendahl. "Bluewand—A versatile remote control and pointing device." Proceedings of the 13th ITG/GI-Fachtagung Kommunikation in Verteilten Systemen (KiVS'2003), Kurzbeiträge, Praxisberichte und Workshop, pp. 81-88, 25.-28. Feb. 2003, Leipzig, Germany.

B. Myers, J. Nichols, J. Wobbrock, K. Litwack, M. Higgins, J. Hughes, T. Harris, R. Rosenfeld and M. Pignol. "Handheld Devices for Control." Presented at: Human-Computer Interaction Consortium (HCIC'2003), Winter Park, CO, Feb. 5-9, 2003.

* cited by examiner

```
<?xml version="1.0" encoding="UTF-8"?>
<Definition date-updated="20030701">
   <Devices>
      <Device id="d01" Name="TV" Type="Television" Manufacture="Tillips">
         <Commands>
            <Command id-="c01" Name="Power ON">
               <IR-Code> 0000-1234-0001</IR-Code>
            </Command>
            <Command id="c02" Name="Power OFF">
               <IR-Code> 0000-1234-0002</IR-Code>
            </Command>
            <Command id-="c03" Name="Channel UP">
               <IR-Code> 0000-1234-0003</IR-Code>
            </Command>
            <Command id="c04" Name="Channel DOWN">
               <IR-Code> 0000-1234-0004</IR-Code>
            </Command>
            <Command id-="c05" Name="Volume UP">
               <IR-Code> 0000-1234-0005</IR-Code>
            </Command>
            <Command id="c06" Name="Volume DOWN">
               <IR-Code> 0000-1234-0006</IR-Code>
            </Command>
            <Command id="c07" Name="SET Channel" Input="Number">
               <IR-Code> 0000-1234-11%Input</IR-Code>
            </Command>
         </Commands>
         <States>
            <State id="s01" Name="Power" Type="Boolean">
               <ModiferCommand id="c01" modify="TRUE"/>
               <ModiferCommand id="c02" modify="FALSE"/>
            </State>
            <State id="s02" Name="Channel" Type="Number" range="1:77">
               <ModiferCommand id="c03" modify="Increment"/>
               <ModiferCommand id="c04" modify="Decrement"/>
            </State>
            <State id="s03" Name="Volume" Type="Number" range="0:100">
               <ModiferCommand id="c05" modify="Increment"/>
               <ModiferCommand id="c06" modify="Decrement"/>
            </State>
         </States>
      </Device>
      <Device id="d02" Name="Cable" Type="Cable set-top-box" Manufacture="Tony">
         <Commands>
            <Command id-="c07">
               <Name> Power ON</Name>
               <IR-Code> 0000-7777-0001</IR-Code>
            </Command>
            <Command id="c08">
               <Name> Power OFF</Name>
               <IR-Code> 0000-7777-0002</IR-Code>
            </Command>
            <Command id-="c09">
               <Name> Channel up</Name>
               <IR-Code> 0000-7777-0003</IR-Code>
```

FIG. 3A: SDLC definition of TV and Set-top box

```
        </Command>
        <Command id="c10">
          <Name> Channel down</Name>
          <IR-Code> 0000-7777-0004</IR-Code>
        </Command>
        <States>
          <State id="s04" Name="Power" Type="Boolean">
            <ModiferCommand id="c01" modify="TRUE"/>
            <ModiferCommand id="c02" modify="FALSE"/>
          </State>
          <State id="s05" Name="Channel" Type="Number" range="1:77">
            <ModiferCommand id="c03" modify="Increment"/>
            <ModiferCommand id="c04" modify="Decrement"/>
          </State>
        </States>
      </Commands>
    </Device>
</Devices>
<Contexts>
  <Context id="con01" Name="TV Watching">
    <ParticipatedDevice id="d01" Name="TV"/>
    <ParticipatedDevice id="d02" Name="Cable"/>
    <Context id="con02" Name="See Cable">
      <Stateconstrain id="s02" Name="Channel">
        <Value> 3 </Value>
      </Stateconstrain>
    </Context>
    <Context Name="See Antena TV">
      <Deviceconstrain id="d02">
        <Operated>NO</Operated>
      </Deviceconstrain>
    </Context>
  </Context>
</Contexts>
<Menus>
  <MenuTree Name="TV watching" Context="con01">
    <Selection>
      <SelectContext id="con02" Name="See Cable">
        <Modify>
          <ModifyState Name="Channel"/>
          <ModifyState Name="Volume"/>
        </Modify>
      </SelectContext>
      <SelectContext id="con03" Name="See Antena TV">
        <Modify>
          <ModifyState Name="Channel"/>
          <ModifyState Name="Volume"/>
        </Modify>
      </SelectContext>
    </Selection>
  </MenuTree>
</Menus>
<Skins>
  <Skin Type="Selection">
    <Menu>TV Watching</Menu>
```

FIG. 3B: SDLC definition of TV and Set-top box

```
            <Element>
               <Type>square buttons</Type>
               <buttons>Selection</buttons>
               <Orientation>vertical</Orientation>
               <Scroll>NO</Scroll>
            </Element>
         </Skin>
         <Skin Type="TV Control">
            <Menu>See Cable</Menu>
            <Menu>See Antena TV</Menu>
            <Element>
               <Type>Cursor</Type>
               <VerticalArrow>Channel</VerticalArrow>
               <HorizontalArrow>Volume</HorizontalArrow>
            </Element>
            <Element>
               <Type>Keypad</Type>
               <Input>Channel</Input>
            </Element>
         </Skin>
      </Skins>
   </Definition>
```

FIG. 3C: SDLC definition of TV and Set-top box

```
<?xml version="1.0" encoding="UTF-8"?>
<Definition date-updated="20030702">
   <Devices>
      <Device id="d01" Name="Living room fron light" Type="Lighting"
Manufacture="Ximco">
         <Commands>
            <Command id-="c01" Name="Turn OFF">
               <IR-Code> 0000-8000-0001</IR-Code>
            </Command>
            <Command id="c02" Name="Turn ON">
               <IR-Code> 0000-8000-0002</IR-Code>
            </Command>
            <Command id-="c03" Name="Dimmer UP">
               <IR-Code> 0000-8000-0003</IR-Code>
            </Command>
            <Command id="c04" Name="Dimmer DOWN">
               <IR-Code> 0000-8000-0004</IR-Code>
            </Command>
         </Commands>
         <States>
            <State id="s01" Name="Light" Type="Number" range="0:100">
               <ModiferCommand id="c01" modify="Minimum"/>
               <ModiferCommand id="c02" modify="Maximum"/>
               <ModiferCommand id="c03" modify="Increment"/>
               <ModiferCommand id="c04" modify="Decrement"/>
            </State>
         </States>
      </Device>
      <Device id="d02" Name="Living room rear light" Type="Lighting"
Manufacture="Ximco">
         <Commands>
            <Command id-="c05" Name="Turn OFF">
               <IR-Code> 0000-8001-0001</IR-Code>
            </Command>
            <Command id="c06" Name="Turn ON">
               <IR-Code> 0000-8001-0002</IR-Code>
            </Command>
            <Command id-="c07" Name="Dimmerl UP">
               <IR-Code> 0000-8001-0003</IR-Code>
            </Command>
            <Command id="c08" Name="Dimmer DOWN">
               <IR-Code> 0000-8001-0004</IR-Code>
            </Command>
         </Commands>
         <States>
            <State id="s01" Name="Light" Type="Number" range="0:100">
               <ModiferCommand id="c05" modify="Minimum"/>
               <ModiferCommand id="c06" modify="Maximum"/>
               <ModiferCommand id="c07" modify="Increment"/>
               <ModiferCommand id="c08" modify="Decrement"/>
            </State>
         </States>
      </Device>
   </Devices>
</Definition>
```

FIG. 4: Command Level SDCL of Living Room Lights

```
<?xml version="1.0" encoding="UTF-8"?>
<Definition date-updated="20030702">
   <Devices>
      <Device id="d01" Name="Living room front light" Type="Lighting"
Manufacture="Ximco">
         <Commands>
            <Command id-="c01" Name="Turn OFF">
               <IR-Code> 0000-8000-0001</IR-Code>
            </Command>
            <Command id="c02" Name="Turn ON">
               <IR-Code> 0000-8000-0002</IR-Code>
            </Command>
            <Command id-="c03" Name="Dimmer UP">
               <IR-Code> 0000-8000-0003</IR-Code>
            </Command>
            <Command id="c04" Name="Dimmer DOWN">
               <IR-Code> 0000-8000-0004</IR-Code>
            </Command>
         </Commands>
         <States>
            <State id="s01" Name="Light" Type="Number" range="0:100">
               <ModiferCommand id="c01" modify="Minimum"/>
               <ModiferCommand id="c02" modify="Maximum"/>
               <ModiferCommand id="c03" modify="Increment"/>
               <ModiferCommand id="c04" modify="Decrement"/>
            </State>
         </States>
      </Device>
      <Device id="d02" Name="Living room rear light" Type="Lighting"
Manufacture="Ximco">
         <Commands>
            <Command id-="c05" Name="Turn OFF">
               <IR-Code> 0000-8001-0001</IR-Code>
            </Command>
            <Command id="c06" Name="Turn ON">
               <IR-Code> 0000-8001-0002</IR-Code>
            </Command>
            <Command id-="c07" Name="Dimmerl UP">
               <IR-Code> 0000-8001-0003</IR-Code>
            </Command>
            <Command id="c08" Name="Dimmer DOWN">
               <IR-Code> 0000-8001-0004</IR-Code>
            </Command>
         </Commands>
         <States>
            <State id="s01" Name="Light" Type="Number" range="0:100">
               <ModiferCommand id="c05" modify="Minimum"/>
               <ModiferCommand id="c06" modify="Maximum"/>
               <ModiferCommand id="c07" modify="Increment"/>
               <ModiferCommand id="c08" modify="Decrement"/>
            </State>
         </States>
      </Device>
   </Devices>
```

FIG. 5A: Complete Level SDCL of Living room lights

```
   <Menus>
      <MenuTree Name="Lights" >
         <Selection>
            <SelectDevice Name="Front Light">
               <Modify>
                  <ModifyState Name="Light"/>
               </Modify>
            </SelectDevice>
            <SelectDevice Name="Rear Light">
               <Modify>
                  <ModifyState Name="Light"/>
               </Modify>
            </SelectDevice>
         </Selection>
      </MenuTree>
   </Menus>
   <Skins>
      <Skin Type="Selection">
         <Menu>Lights</Menu>
         <Element>
            <Type>square buttons</Type>
            <buttons>Selection</buttons>
            <Orientation>vertical</Orientation>
            <Scroll>NO</Scroll>
         </Element>
      </Skin>
      <Skin Type="DirectDevice">
         <Menu>Front Light</Menu>
         <Menu>Rear Light</Menu>
         <Element>
            <Type>Button</Type>
            <Text>Turn ON</Text>
            <Command>Turn ON</Command>
         </Element>
         <Element>
            <Type>Button</Type>
            <Text>Turn OFF</Text>
            <Command>Turn OFF</Command>
         </Element>
         <Element>
            <Type>Button</Type>
            <Text>Dimmer UP</Text>
            <Command>Dimmer UP</Command>
         </Element>
         <Element>
            <Type>Button</Type>
            <Text>Dimmer DOWN</Text>
            <Command>Dimmer DOWN</Command>
         </Element>
      </Skin>
   </Skins>
</Definition>
```

FIG. 5B: Complete Level SDCL of Living room lights

```
<?xml version="1.0" encoding="UTF-8"?>
<Definition date-updated="20030703">
 <Devices>
    <Device id="d01" Name="TV" Type="Television" Manufacture="Tillips">
       <Commands>
          <Command id-="c01" Name="Power ON">
             <IR-Code> 0000-1234-0001</IR-Code>
          </Command>
          <Command id="c02" Name="Power OFF">
             <IR-Code> 0000-1234-0002</IR-Code>
          </Command>
          <Command id-="c03" Name="Channel UP">
             <IR-Code> 0000-1234-0003</IR-Code>
          </Command>
          <Command id="c04" Name="Channel DOWN">
             <IR-Code> 0000-1234-0004</IR-Code>
          </Command>
          <Command id-="c05" Name="Volume UP">
             <IR-Code> 0000-1234-0005</IR-Code>
          </Command>
          <Command id="c06" Name="Volume DOWN">
             <IR-Code> 0000-1234-0006</IR-Code>
          </Command>
          <Command id="c07" Name="SET Channel" Input="Number">
             <IR-Code> 0000-1234-11%Input</IR-Code>
          </Command>
       </Commands>
       <States>
          <State id="s01" Name="Power" Type="Boolean">
             <ModiferCommand id="c01" modify="TRUE"/>
             <ModiferCommand id="c02" modify="FALSE"/>
          </State>
          <State id="s02" Name="Channel" Type="Number" range="1:77">
             <ModiferCommand id="c03" modify="Increment"/>
             <ModiferCommand id="c04" modify="Decrement"/>
          </State>
          <State id="s03" Name="Volume" Type="Number" range="0:100">
             <ModiferCommand id="c05" modify="Increment"/>
             <ModiferCommand id="c06" modify="Decrement"/>
          </State>
       </States>
    </Device>
    <Device id="d02" Name="Cable" Type="Cable set-top-box" Manufacture="Tony">
       <Commands>
          <Command id-="c07">
             <Name> Power ON</Name>
             <IR-Code> 0000-7777-0001</IR-Code>
          </Command>
          <Command id="c08">
             <Name> Power OFF</Name>
             <IR-Code> 0000-7777-0002</IR-Code>
          </Command>
          <Command id-="c09">
             <Name> Channel up</Name>
```

FIG. 6A: SDCL Of the whole living room

```
            <IR-Code> 0000-7777-0003</IR-Code>
         </Command>
         <Command id="c10">
            <Name> Channel down</Name>
            <IR-Code> 0000-7777-0004</IR-Code>
         </Command>
         <States>
            <State id="s04" Name="Power" Type="Boolean">
               <ModiferCommand id="c01" modify="TRUE"/>
               <ModiferCommand id="c02" modify="FALSE"/>
            </State>
            <State id="s05" Name="Channel" Type="Number" range="1:77">
               <ModiferCommand id="c03" modify="Increment"/>
               <ModiferCommand id="c04" modify="Decrement"/>
            </State>
         </States>
      </Commands>
   </Device>
   <Device id="d11" Name="Livingroom fron light" Type="Lighting"
Manufacture="Ximco">
      <Commands>
         <Command id-="c11" Name="Turn OFF">
            <IR-Code> 0000-8000-0001</IR-Code>
         </Command>
         <Command id="c12" Name="Turn ON">
            <IR-Code> 0000-8000-0002</IR-Code>
         </Command>
         <Command id-="c13" Name="Dimmer UP">
            <IR-Code> 0000-8000-0003</IR-Code>
         </Command>
         <Command id="c14" Name="Dimmer DOWN">
            <IR-Code> 0000-8000-0004</IR-Code>
         </Command>
      </Commands>
      <States>
         <State id="s01" Name="Light" Type="Number" range="0:100">
            <ModiferCommand id="c11" modify="Minimum"/>
            <ModiferCommand id="c12" modify="Maximum"/>
            <ModiferCommand id="c13" modify="Increment"/>
            <ModiferCommand id="c14" modify="Decrement"/>
         </State>
      </States>
   </Device>
   <Device id="d12" Name="Livingroom rear light" Type="Lighting"
Manufactor="Ximco">
      <Commands>
         <Command id-="c15" Name="Turn OFF">
            <IR-Code> 0000-8001-0001</IR-Code>
         </Command>
         <Command id="c16" Name="Turn ON">
            <IR-Code> 0000-8001-0002</IR-Code>
         </Command>
         <Command id-="c17" Name="Dimmerl UP">
            <IR-Code> 0000-8001-0003</IR-Code>
```

FIG. 6B: SDCL Of the whole living room

```
            </Command>
            <Command id="c18" Name="Dimmer DOWN">
               <IR-Code> 0000-8001-0004</IR-Code>
            </Command>
         </Commands>
         <States>
            <State id="s11" Name="Light" Type="Number" range="0:100">
               <ModiferCommand id="c15" modify="Minimum"/>
               <ModiferCommand id="c16" modify="Maximum"/>
               <ModiferCommand id="c17" modify="Increment"/>
               <ModiferCommand id="c18" modify="Decrement"/>
            </State>
         </States>
      </Device>
   </Devices>
   <Contexts>
      <Context id="con01" Name="TV Watching">
         <ParticipatedDevice id="d01" Name="TV"/>
         <ParticipatedDevice id="d02" Name="Cable"/>
         <Context id="con02" Name="See Cable">
            <Stateconstrain id="s02" Name="Channel">
               <Value> 3 </Value>
            </Stateconstrain>
         </Context>
         <Context Name="See Antena TV">
            <Deviceconstrain id="d02">
               <Operated>NO</Operated>
            </Deviceconstrain>
         </Context>
      </Context>
   </Contexts>
   <Menus>
      <MenuTree Name = "Living room">
         <Selection Option="TV watching">
            <MenuTree Name="TV watching" Context="con01">
               <Selection>
                  <SelectContext id="con02" Name="See Cable">
                    <Modify>
                          <ModifyState Name="Channel"/>
                          <ModifyState Name="Volume"/>
                    </Modify>
                  </SelectContext>
                  <SelectContext id="con03" Name="See Antena TV">
                    <Modify>
                          <ModifyState Name="Channel"/>
                          <ModifyState Name="Volume"/>
                    </Modify>
                  </SelectContext>
               </Selection>
            </MenuTree>
         </Selection>
         <selection Option = "Lights">
            <MenuTree Name="Lights" >
               <Selection>
```

FIG. 6C: SDCL Of the whole living room

```
                <SelectDevice Name="Front Light">
                  <Modify>
                        <ModifyState Name="Light"/>
                  </Modify>
                </SelectDevice>
                <SelectDevice Name="Rear Light">
                  <Modify>
                        <ModifyState Name="Light"/>
                  </Modify>
                </SelectDevice>
             </Selection>
          </MenuTree>
       </selection>
    </MenuTree>
</Menus>
<Skins>
   <Skin Type="Living Room">
      <Menu>Living Room</Menu>
      <Menu>Lights</Menu>
      <Menu>TV Watching</Menu>
      <Element>
         <Type>square buttons</Type>
         <buttons>Selection</buttons>
         <Orientation>vertical</Orientation>
         <Scroll>NO</Scroll>
      </Element>
   </Skin>
   <Skin Type="TV Control">
      <Menu>See Cable</Menu>
      <Menu>See Antena TV</Menu>
      <Element>
         <Type>Cursor</Type>
         <VerticalArrow>Channel</VerticalArrow>
         <HorizontalArrow>Volume</HorizontalArrow>
      </Element>
      <Element>
         <Type>Keypad</Type>
         <Input>Channel</Input>
      </Element>
   </Skin>
   <Skin Type="DirectDevice">
      <Menu>Front Light</Menu>
      <Menu>Rear Light</Menu>
      <Element>
         <Type>Button</Type>
         <Text>Turn ON</Text>
         <Command>Turn ON</Command>
      </Element>
      <Element>
         <Type>Button</Type>
         <Text>Turn OFF</Text>
         <Command>Turn OFF</Command>
      </Element>
      <Element>
```

FIG. 6D: SDCL Of the whole living room

```
            <Type>Button</Type>
            <Text>Dimmer UP</Text>
            <Command>Dimmer UP</Command>
         </Element>
         <Element>
            <Type>Button</Type>
            <Text>Dimmer DOWN</Text>
            <Command>Dimmer DOWN</Command>
         </Element>
      </Skin>
   </Skins>
</Definition>
```

FIG. 6E: SDCL Of the whole living room

METHOD AND APPARATUS FOR UNIFIED CONTROL OF MULTIPLE DEVICES

RELATED PATENT APPLICATIONS

This invention claims priority of U.S. provisional patent application Ser. No. 60/488,828 entitled A METHOD AND DEVICE FOR UNIFIED CONTROL OF MULTIPLE DEVICES, filed Jul. 21, 2003, attorney/agent ref. no. PALM001P. Such provisional patent application is incorporated herein by reference.

BACKGROUND

Everywhere we go in modern life we seem to be controlling devices, e.g., remotely controlling devices. By controlling it is meant sending commands such as control signals that change the operation of one controlled device or another. Such controlled devices can include home electronic devices like TVs or VCRs, lighting, and home appliances such as dishwashers, microwave ovens, washer/dryers, etc. These devices may have movable elements and their control may cause movement, e.g., doors, blinds or shades that are moved by remote control.

As our environment becomes more and more complex, we have more and more devices to control. For example, what used to be a single living room lamp a couple of generations ago, today may be replaced by ten different spotlights with dimmers. We also have as many as 500 television channels to choose from. We also can play DVDs, download music, and do wonders with a microwave oven.

The current state of the art in personal device control is the "Push Button" interface, in which a user is presented with a panel full of buttons (up to 50 in some cases), and where each button performs a different command, e.g., generates a control signal to change the operation of the controlled device.

Remote control devices are already in widespread use in the home electronic arena, where 99% of the controlled devices come with a bundled remote control device. In this area, namely the home electronic arena, we see also the Universal Remote control devices. These devices "unify" the set of buttons of multiple remote control devices into one remote control device. Typically the first operation a user performs with a universal remote control device (a "controlling device") is to select the type of controlled device that the user wishes to control. Following that, a user can then push buttons to command the controlled device.

There are a lot of shortcomings in today's technology for remotely controlling devices, e.g., using a remote control:

(1) To remotely control even a single controlled device, there is a limit to what one can do by just having a limited set of predefined commands, e.g. buttons. For example, programming a VCR to record a TV program using a push button interface is accepted to be very difficult for most people. There thus is a limit to the complexity of operations using pushbuttons.

The controlled devices become harder to use, e.g., more complicated.

The control of advance features of the controlled device becomes limited. For example, few people use an advanced feature, such as a "Cook Wizard," of a microwave oven.

The design of new features in a controlled device becomes limited because not every feature can be simply controlled by a set of buttons.

(2) When each controlled device has a separate remote control device, and there are multiple controlled devices, there is a physical problem of having too many remote control devices, e.g., too many separate remote controls.

(3) When, multiple controlled devices are in the same environment, it is often the case that they are connected to each other. While operating the devices, the user needs to be acquainted with the way the devices are connected, which is sometimes counterintuitive. An example of a counterintuitive situation involves a TV and a cable set-top box. To operate such a combination, it may be that to control the volume, a volume-up command should be sent to the TV, not the set-top box, while to change channels, a channel-up command needs to be sent to the set-top box, not to the TV. A user not aware of this fact may send a channel-up command to the TV, causing undesired results, such as the TV no longer displaying the output of the cable set-top box, e.g., resulting in a white screen on the TV. The user at this point may have no idea what to do next. Situations can become even more complex when considering many current home theatre systems, where, for example, the Brighter-picture command should be sent to the TV, the Volume-up command should be sent to the A/V receiver, and the channel-up command should be sent to the cable box.

Thus, there is a need for simple, intuitive and easy-to-use method of controlling multiple devices, operable by a lay user to a dynamic conglomerate of feature-rich controlled devices.

SUMMARY

Disclosed herein is a method and apparatus to control any one of a plurality of devices. The method comprises, for each device of the plurality, receiving a definition language. The definition language including a command description to be associated with the device. The method further comprises accepting input from a user. The method further comprises generating one or more control signals for at least one of the devices of the plurality. The generating is to control the at least one of the devices according to the accepted input. The generating uses the definition language and the accepted input.

Also disclosed herein is a method. The method comprises receiving a definition language. The definition language includes at least one element of a group consisting of a command element, a state element, a context element, a menu tree and a skin element. The method further comprises processing the definition language to control a device.

BRIEF DESCRIPTION OF THE DRAWINGS

FIGS. 3A–3C show one embodiment of a definition language (SDLC) in XML for a TV and set-top box.

FIG. 4 shows one embodiment of a command level definition language (SDLC) in XML for living room lights.

FIGS. 5A and 5B show one embodiment of a complete definition language (SDLC) in XML, including menu trees, for living room lights.

FIGS. 6A–6E show one embodiment of a definition language (SDLC) in XML for an entire living room definition as could be generated by combining the files shown in FIGS. 3A–3C and FIGS. 5A and 5B.

DETAILED DESCRIPTION

Overview

Figure 1:
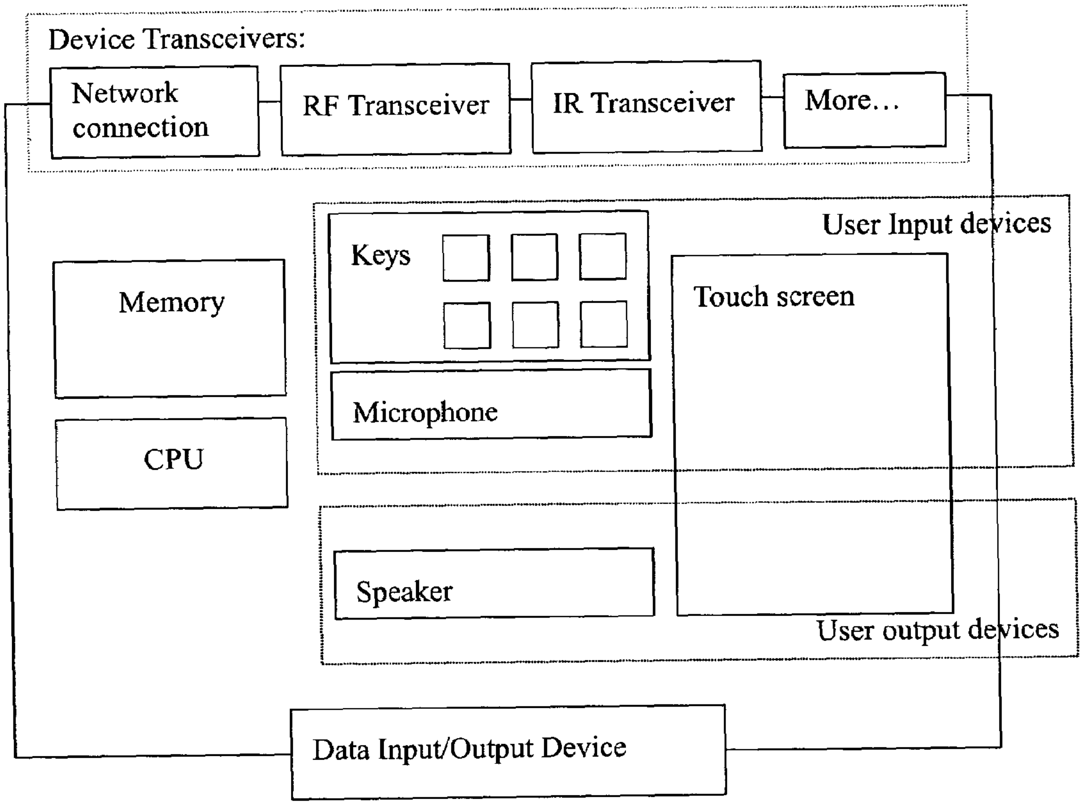
FIG. 1 shows a diagram of one embodiment of a unified remote controlling device. A unified remote controlling device can contain a number of elements such as one or more network connections, RF and/or IR transceivers, a touchscreen, etc.

Herein is described a definable unified control unit, and a language therefor to define its operation. The language, called Simple Device Control Language, or simply SDCL herein, defines the control operation in the following multiple layers:

- Command layer: A "command description layer" describes the commands, e.g., the control signals that can be sent to a controlled device (such as Volume-up, Volume-down, and Mute for a device that includes audio, e.g., a TV). Similarly, Channel-up and Channel down are commands for a TV.
- Controlled Device States layer: The Controlled Device States layer describes the states available for a controlled feature in a controlled device. Such states are changed by commands. For example, VOLUME is a feature that has a state that, in one implementation, is defined by a number 0–100 for a TV. In one implementation the volume state is changed by three commands: Volume-up, Volume-down and Mute. The names of these commands define the changes to the state. Similarly, for a TV, CHANNEL is a feature that has a state channel number.
- Controlled Devices' Contexts: This layer describes the dependencies between states of different controlled devices for particular types of combinations. For example, TV viewing using a set-top box may be one context, in which the cable box state is set to TV, setting the TV channel state to 3, and the TV channel up and down commands are disabled.
- Function Menus: This layer describes the functions provided to the user. These functions can indicate what the user is doing and/or can be translated to multiple commands. For example, a function called View TV can be defined as a set of control signals to set the TV to channel 3 and to power the set-top box. Functions can also issue no commands. For example, Choose channel can be defined to send no channel change command but rather to display a list of channels for the user to choose from.
- Skins: This layer describes the actual presentation of a specific menu, i.e., the user interface presented to a user.

A control system using the above language includes:

- A generic remote control device, e.g., a programmable device that accepts such definitions, and, using such definitions is able to implement a fully operated control on each of a set of controlled devices and contexts.
- A customization system that adapts the operation of the control system by changing the SDCL including one or more of:
  - Creating a new SDCL definition.
  - Automatically complementing an SDLC definition.
  - Modifying an existing SDCL definition.
  - Automatically merging two existing SDCL definitions.

In particular, the customization system is able to take two different definitions and create a new device by merging the definitions into a unified view, what is called "checking in" a new controlled device. The customization system similarly accepts a definition and removes a controlled device, what is called "checking out" a controlled device.

One aspect of the invention is that such controlled device check-in and controlled device check out can be performed automatically while the controlling device is near the controlled device, so the control device dynamically changes to control the relevant devices. Thus, one aspect of the invention is the exchange of information that occurs when the remote controlling device is near a controlled unit and communicates therewith. This could be done in an automatic (without any human intervention) or semi-automatic (with some human intervention) way:

- When done automatically: In one embodiment the control unit keeps transmitting a signal and nearby devices, while receiving this signal, will send back an identification of who they are and their SDLC definition. The control unit will automatically merge this definition into the existing device's definitions.
- When done semi-automatically: In one embodiment the user using the control unit will point to the device, and press a button. This will send a signal to the device, and then the device will send back its SDLC definition that will then be merged into the exiting definitions of the control unit.

For example, a user using such a control unit can drive to his home. While at the front gate, the unit automatically presents to the user controls to open the gate. When arriving at the house the control unit will allow the user to open the garage door, then to turn on lights, and while in the living room will allow the user to control the home theater system.

Features

Aspects of the invention provide one or more of the following features that may not be available with today's state of the art:

- A definition based control system that can run on different hardware platforms. So the same definition could be used on a Palm Pilot, a PocketPC handheld, a smart phone, a dedicated control device, etc.
- Intuitive and easy to use operation because aspects of the invention allow the user to use high-level user functions rather than simple device commands.
- A device with which operating multiple connected controlled devices is relatively straightforward. The language defines the context so, for example, channel-up will go to the set-top box while volume-up goes to the TV.
- A device that can operate advanced features of a controlled device using drill down menus. For example, aspects of the invention can make it easy for the user to use the automatic cooking ability of a microwave oven.
- A device that can be used everywhere, in different rooms or different locations, with automatic or semi-automatic check-in and check-out of controlled devices by physical proximity.

Language Definition

The underlying definition language, the Simple Device Control Language (SDCL) contains elements for each of its layers. In one embodiment, each element has an ID. An element may have one or more properties (or no properties), and possibly a link to other elements. In one embodiment, the syntax substantially conforms to XML. In other embodiments, the syntax substantially differs from XML.

For example, one embodiment of the language contains the following elements:

- A Command Element defined by: Command-ID, Controlled Device-ID, IR code, Function Name;
- A State Element defined by State-ID, Controlled Device-ID, State name, linked commands;
- A Context Element defined by Controlled Device-ID one, State-ID one, Controlled Device-ID two, state-ID two, context-type (e.g., dependent upon);
- A Menu Tree: Tree of functions, each one is either a father (parent) of other functions or list of commands
- A Skin Element: Contains a set of functions with graphical definitions In one embodiment, the language uses XML as shown in FIGS. 3A–3C titled "SDLC definition of TV and Set-top box."

Unified Remote Control Device Operation

In one embodiment, the unified remote control device is shown in FIG. 1 and in one embodiment includes the following elements:

- One or more CPUs.
- At least one memory to store the control program and the SDCL definitions.
- At least one user input element such as:
  - A screens or touch screen;
  - A set of input keys;
  - At least one microphone.
- At least one user output element such as:
  - At least one touch screen;
  - At least one loudspeaker.
- A set of one or more transceivers to communicate with controlled devices, such as:
  - At least one IR transceiver to communicate with IR controlled devices;
  - At least one RF Transceivers (to communicate with RF controlled devices;
  - At least one Network interfaces (to communicate with network operated controlled devices.
- At least one data input/output element to receive SDCL definitions and program updates such as:
  - At least one detachable ROM;
  - At least one network connection;
  - At least one USB connection to one or more PCs.

The basic operation of the unified remote control device is as follows:

- The unit receives an initial SDCL definition using the Data IO element and saves it into memory.
- The generic control program (stored in memory) reads the SDLC and creates the user interaction.
  - Using the user output elements (such as touch screen or speaker) it prompts the user for available options.
  - Receiving input from the user (using user input elements such as from the touch screen, keys, or microphone) it changes accordingly the user prompt and sends the appropriate commands to the controlled devices.

Figure 2:
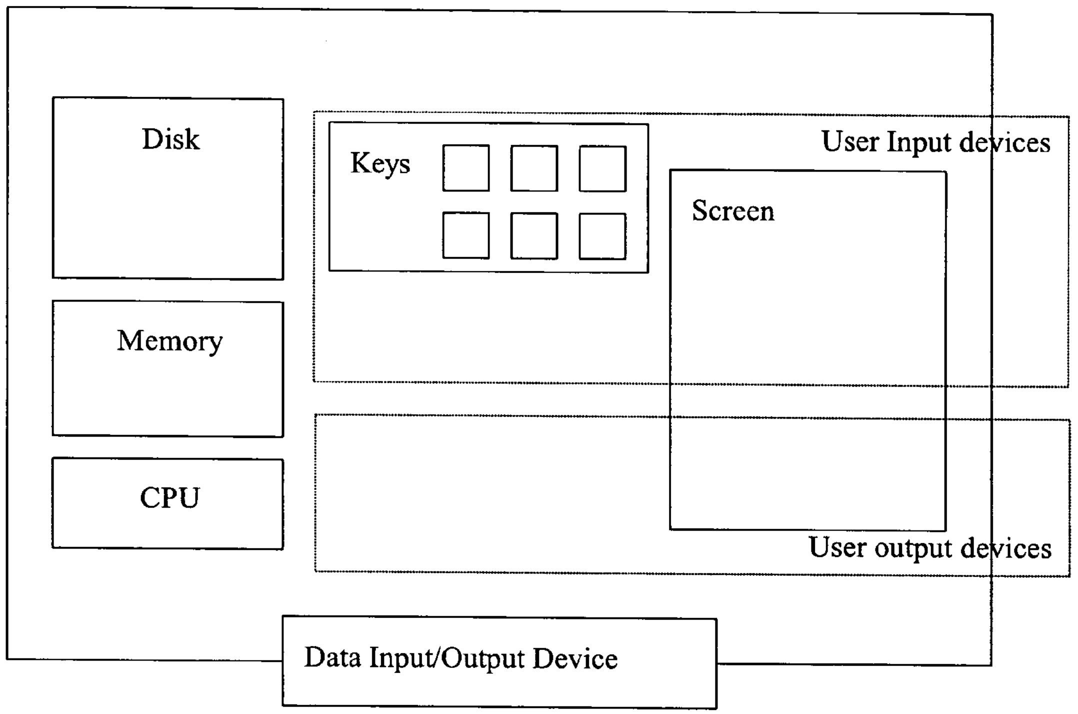
FIG. 2 shows a diagram of one embodiment of a customization system. The customization system can be a distinct computing system separate from the control unit. Another embodiment uses the same computing system as the unified remote controlling device.

An important feature is that once the unit is operational, it can receive new definitions, e.g., by simply being in the vicinity of a new set of devices. Thus, the same device in one room can control a sound system, and for example, in the kitchen, receives commands from the devices in the kitchen and then commands the devices in the kitchen Customization System Operation One embodiment of a customization system carries out the following processes:

- Creates a new SDCL definition
- Automatically complements an SDLC definition
- Modifies existing SDCL definition
- Automatically merges two existing SDCL definitions FIG. 2 shows one embodiment of a customization system. In such an embodiment, the customization system is a distinct computing system separate from the control unit. Another embodiment uses the same computing system as the unified remote control device.

The basic operation of the customization system includes:

- Receiving an SDLC definition from the input/output element, or reading it from the disk, or creating a new SDLC definition from an empty definition
- Performing one of the processes as listed above
- Saving the modified definition(s) to disk, or send it using the Data I/O element The processes carried out by the customization system include:

- Creating a new SDCL definition: In one embodiment, this is done as follows:
  - Allowing the user to write the SDCL language in a text editor
  - Providing the user with a user interface to create and SDCL definition
  - Having controlled device definition in another format, and providing a program for automatic conversion to SDCL
- Automatically complementing an SDLC definition
  - This function is taking as input a non-complete language (a non-complete should have all of the command layer but part or none from the state, context, functions and skins). This function automatically completes all the levels to a definition that could be fully implemented.
  - In one embodiment, this function transforms the Command Level SDCL shown in FIG. 4 ("Command Level SDCL of Living room lights") to FIGS. 5A and 5B ("Complete Level SDCL of Living room lights"). It will copy the command definitions and automatically create a menu tree where the top level is a selection of devices. The next levels in the menu are selections for any applicable device command. The skins will automatically generate each menu, each skin becoming a list of square buttons. In another embodiment, graphics are embedded by putting an up-arrow button for a command that includes the text "UP".
- Modifying an Existing SDCL Definition: this function provides the user with a program to modify each element in an SDCL definition, for example:
  - Adding/deleting/modifying commands by either entering it manually or "teaching" it from an existing remote control device or using an existing definition file.
  - Adding/deleting/modifying controlled device states
  - Adding/deleting/modifying controlled device contexts
  - Adding/deleting/modifying function menus
  - Adding/deleting/modifying skins. In one embodiment, this is by using a graphical editor or by using some existing definitions
- Automatically Merging Two Existing SDCL Definitions: this function takes as input two different SDCL definitions, and creates a unified view out of it. This will include:

Combining the new command layer to be the union of the two.

Combining the new state level to be the union of the two.

Automatically creating context between the two definitions.

Automatically merging the two function trees into one.

Automatically modifying the skins to accommodate to the new environment.

One embodiment of this process will take the SDLC of FIGS. 5A–5B ("Complete SDCL of Living room lights") and combine it with the SDLC of FIGS. 3A–3C ("SDCL of TV and Set-top Box") to create the SDLC shown in FIGS. 6A–6E ("SDCL of the whole living room").

A key aspect of the invention is that the process includes, for each device of a plurality of devices, receiving a definition language. The definition language for a device includes a command description to be associated with the device. The process includes accepting input from a user, and generating one or more control signals for at least one of the devices of the plurality to control the at least one of the devices according to the accepted input. The generating uses the definition language and the accepted input.

What commands are generated depends on the configuration of devices. Thus, in a simple case, the plurality of devices includes a first subset of devices in a first region according to a first configuration, and a second subset of devices in a second region according to a second configuration. The process is such that when the step of accepting input from a user occurs in the first region, the generating of one or more control signals is for the devices in the first region according to the first configuration, and when the accepting input from a user occurs in the second region, the generating of one or more control signals is for the devices in the second region according to the second configuration.

Another aspect of the invention is a controlling device that carries out such a process. Thus, another aspect is a controlling device to control a plurality of devices. The device includes a control processor to accept definitions in a definition language. The definition language includes at least one command element to define how to control one or more devices, at least one state element to define the states of different command elements, at least one context element to relate multiple devices, at least one menu tree to define operations, at least one command skin element to define a user interface, and a definition providing for controlling a set of controlled devices. The control processor is programmed to adapt including one or more of:

creating a new definition in the definition language;

automatically complementing a definition in the definition language; and modifying an existing definition in the definition language.

In a simple case, the controlling device includes definitions for a plurality of devices that includes a first subset of devices in a first region according to a first configuration, and a second subset of devices in a second region according to a second configuration, such that when the controlling device is in the first region, the control processor generates in response to a user input one or more control signals for the devices in the first region according to the first configuration, and when the controlling device is in the second region, the control processor generates in response to a user input one or more control signals for the devices in the second region according to the second configuration.

Variations

Note that while the specification refers to "remote" control devices, it is to be understood that the control device may be physically co-located with the controlled device, as in the case of a typical microwave oven, or remotely located. When the control device is remote, it could be either wired to the controlled device, e.g., a heating system, or wireless, e.g., a TV remote control device or a remote garage door opener.

One embodiment of each of the methods described herein is in the form of a computer program that executes on a processing system, e.g., a one or more processors that are part of a PDA, or another device that includes a processor. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. The unified control device, for example, may be implemented in a system that includes such a processor. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A controlling device comprising:

a control processor accepting definitions in a definition language, the definition language including at least one command element to define how to control one or more devices, at least one state element to define the states of different command elements, at least one context element to relate multiple devices, at least one menu tree to define operations, and at least one command skin element to define a user interface, a definition providing for controlling a set of controlled devices, the control processor programmed to adapt including one or more of:

creating a new definition in the definition language;

automatically complementing a definition in the definition language; and modifying an existing definition in the definition language.

* * * * *